Figure 1:
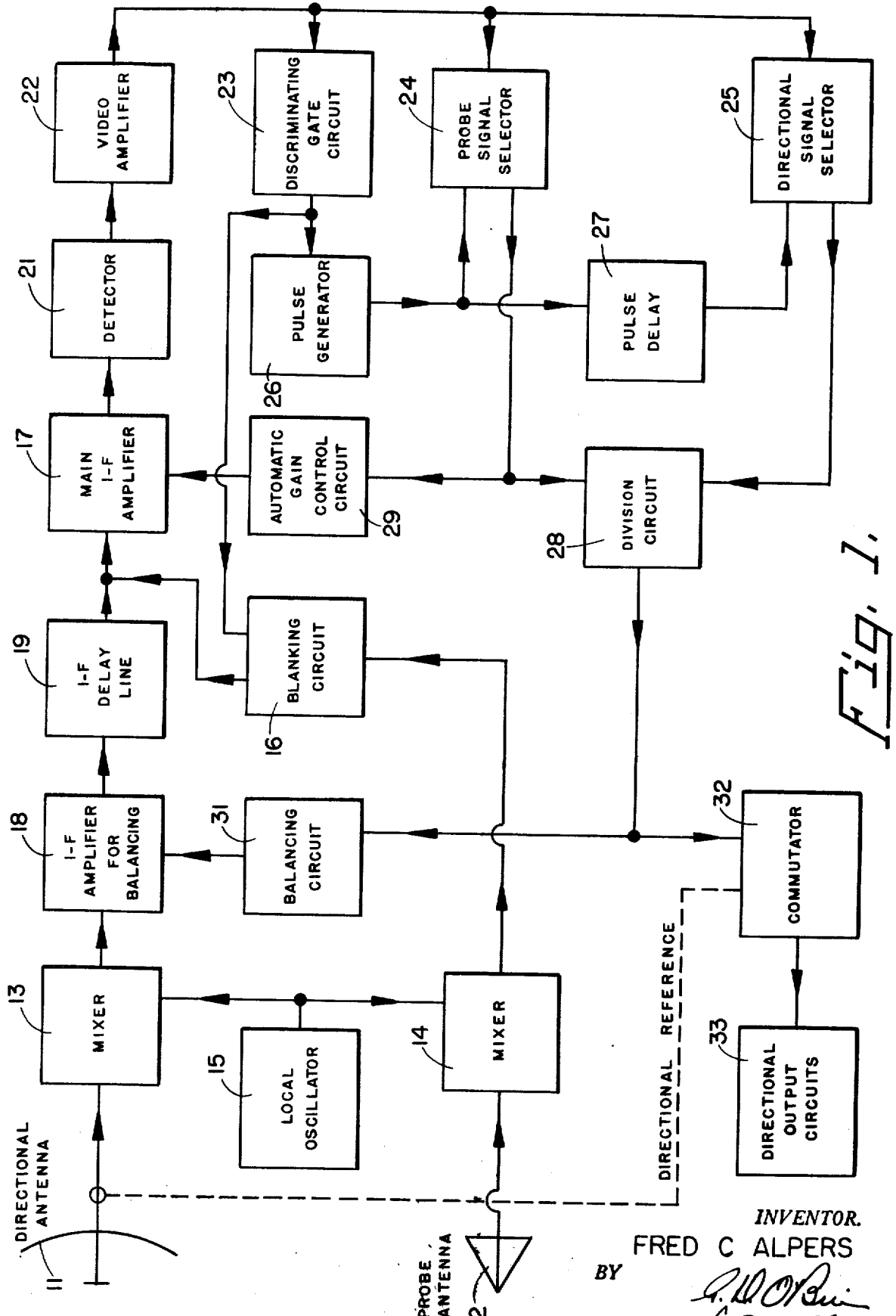

United States Patent [19]
Alpers

[11] 3,895,385
[45] July 15, 1975

[54] DELAY TYPE PROBE ANTENNA NOISE CANCELLATION SYSTEM

[75] Inventor: Frederick C. Alpers, Riverside, Calif.

[73] Assignee: The United States of America as represented by the Secretary of the Navy, Washington, D.C.

[22] Filed: June 29, 1956

[21] Appl. No.: 595,020

[52] U.S. Cl............ 343/113 R; 343/16 R; 343/120
[51] Int. Cl................................................ G01s 3/06
[58] Field of Search .......... 343/100, 113, 5 A, 115, 343/16, 120

[56] References Cited
UNITED STATES PATENTS
3,296,619  1/1967  Alpers................................ 343/120

Primary Examiner—Maynard R. Wilbur
Assistant Examiner—Richard E. Berger
Attorney, Agent, or Firm—Richard S. Sciascia; Joseph M. St.Amand

EXEMPLARY CLAIM

1. A system for obtaining accurate directional information with regard to the relative position of a pulsed radar source comprising means for receiving signals from said source through a directional antenna and a probe antenna, and means for dividing the signal from said directional antenna by the signal from said probe antenna over a wide dynamic range of modulation.

12 Claims, 2 Drawing Figures

INVENTOR.
FRED C ALPERS

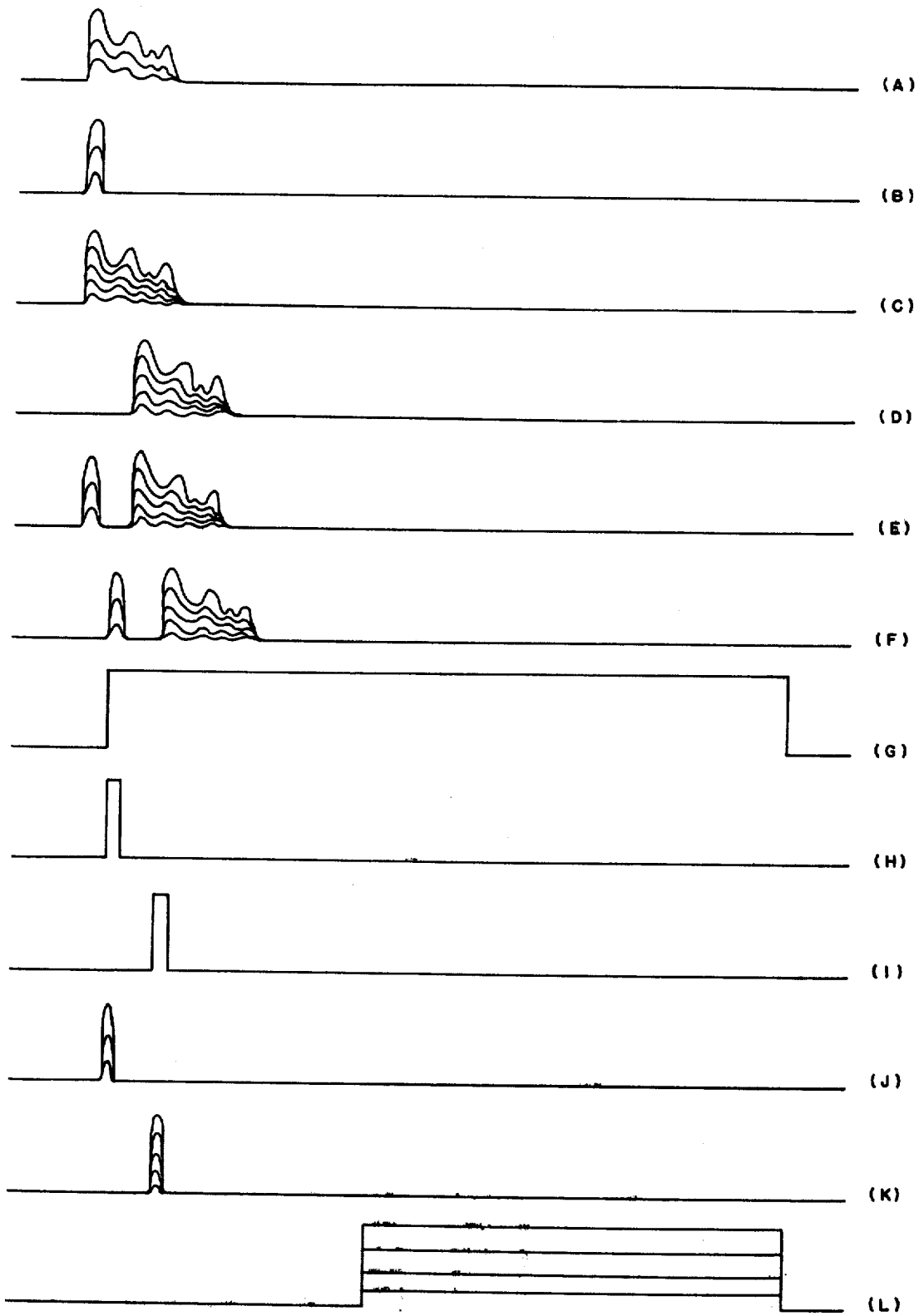

DELAY TYPE PROBE ANTENNA NOISE CANCELLATION SYSTEM

The invention described herein may be manufactured and used by or for the Government of the United States of America for governmental purposes without the payment of any royalties thereon or therefor.

This invention relates to a delay type probe antenna noise cancellation system and more particularly to a system and apparatus for obtaining noise-free directional information regarding a source of a pulsed radar signal which is noise-modulated and which is effective over a wide dynamic range of modulation without introducing undue complexity.

In military applications this directional information might be used as a basis for automatic missile homing on an enemy radar source or as a basis for weapon fire or other action against that source. The source might be a surface radar installation, an airborne set, or a jamming device which emits signals intended to modulate or distort the normal pulse echo signals returning to one's own radar.

Due to intentional or unintentional actions on the part of the enemy, the signal received from sources such as those specified above are generally subject to a high degree of modulation. This modulation frequently occurs at frequencies used for the scanning or lobe switching action of friendly radar direction finders, and it therefore readily distorts or disrupts the directional information gained. Since the modulation is undesirable and is beyond friendly control, it will be termed noise in this disclosure.

Including techniques which are intended primarily to give directional information based on echoes from one's own radar but which might be used in the presence of the noise described above, there are three older methods of gaining directional information pertaining to a pulsed radar source. These involve (1) mechanical scanning, (2) electronic lobe switching, or (3) simultaneous lobing (also known as monopulsing). The first two methods encounter serious difficulties when there is noise present in the radar or jamming signal which occurs in the same frequency band as the scanning or switching frequency, and this is frequently the case. The third method is generally preferable to the other two, but it involves use of a complex r-f system which is difficult to manufacture, and it suffers from having a limited dynamic range of effective operation (i.e., a limited extent of source power against which it is automatically effective).

Another method of obtaining accurate directional information regarding the relative position of the source of electromagnetic radiation is disclosed in the co-pending application of Frederick C. Alpers for "A Simple Form of Probe Antenna Noise Cancellation System," Ser. No. 595,019, filed June 29, 1956, now U.S. Pat. No. 3,296,619, in which a probe antenna is utilized with related circuitry to obtain and use a reference signal in such a way that noise modulation may be cancelled out of a directional device. However, the usefulness of this system is limited to cancellation of source noise which is of a lower frequency character than the capabilities of the gain control circuit and some, but not all, applications of this simple system are precluded by this limitation.

Briefly stated, one preferred embodiment of the present invention as disclosed herein consists essentially of a directional antenna and a probe antenna which receive signals which are a function $f(t) g(t)$ and a function $f(t)$ respectively. These signals after mixing with a common local oscillator signal are combined with the signal from the directional antenna being delayed and the signal from the probe antenna passing through a blanking circuit before being combined. The combined signals are amplified, detected, and further amplified through common elements before passing through selector circuits which separate the probe signals and the directional signal. The probe signal is applied to an automatic gain control circuit which controls the main i-f amplifier and also goes to a division circuit which receives the directional signal and divides the directional signal $f(t) g(t)$ by the probe signal $f(t)$. The output of the division circuit is applied to a commutator circuit which provides information to the directional output circuits. The output of the division circuit is also applied to a balancing circuit which controls the i-f amplifier for balancing in such a way that the gains of the probe signal channel and the directional signal channel are automatically balanced. If desired, attenuators may be provided between the antennas and the mixers. The attenuators can be controlled by the automatic gain control circuit to extend the dynamic range of the system even farther than otherwise provided, and they also protect the mixer against damage by very powerful incoming signals.

One object of the present invention is to provide an improved system and apparatus for obtaining noise-free directional information regarding a source of a pulse radar signal which is noise-modulated and which is effective over a wide dynamic range of modulation without introducing undue complexity.

Another object of the present invention is to provide an improved system for obtaining accurate directional information in regard to the relative position of a pulsed radar source wherein one main amplifier system is utilized to handle two signals received simultaneously by delaying one by a different amount than the other prior to joining the two and amplifying them.

A still further object of the present invention is to provide an improved system for obtaining accurate directional information in regard to the relative position of a pulsed radar source which utilizes technique of delaying and gating which combines two pulse signals, passes them through common amplifying and processing circuits, and later separates them into two distinct signals.

Still another object of the present invention is to provide an improved noise-canellation system which utilizes discriminating gate feedback to an early receiver stage in order to exclude unwanted signals including undesirable trailing portions of an incoming signal.

A still further object of the present invention is to provide an improved system of the type described which utilizes an automatic balancing circuit which alleviates manufacturing tolerance and drift difficulties between antenna channels.

Other objects of many of the attendant advantages of this invention will be readily appreciated as the same becomes better understood by reference to the following detailed description when considered in connection with the accompanying drawings wherein:

FIG. 1 is a block diagram illustrating one preferred embodiment of the present invention; and FIG. 2 is a waveform diagram illustrating the various waveforms in differnet portions of the circuit of FIG. 1.

Referring now to the drawings in detail, the operation of this invention may be explained by reference to the block diagram of FIG. 1. In summary, the explanation will show that two antennas are used, a directional antenna 11 which receives the product of a noise signal f(t) and a directional signal g(t), and the fixed probe antenna 12 which receives only the noise signal f(t). A means is then provided whereby the signal from the first antenna is divided by that from the second. Neglecting the constants involved, this gives $$\frac{f(t)g}{f(t)} = g(t),$$

which is the directional signal free from the noise effects. Thus the system is a noise cancellation system.

A system is used in which the one antenna 11 is either a mechanically scanned or electronically switched antenna, hereafter referred to as a directional antenna, which by commonly understood techniques receives signals alternately from different directions so that the signals received may later be compared in order to determine the direction from which the signal originated. The second antenna 12 is a fixed antenna, hereafter called a probe antenna, which receives the signals without any directional sensing involved. Except for the scanning or switching action of the one, the two antennas are generally alike, although they need not be precisely aligned with respect to each other, and they need not have the same gain nor beam-width. About the only requirements of close similarity between the antennas which arise are those which arise if either the source frequency or the source polarization is varied rapidly. In these special cases the antennas must be fairly well matched in bandwidth and polarization characteristics, but this is not overly difficult.

Each of the two antennas 11 and 12 feeds the radar or radio frequency (r-f) signal which it receives to its respective mixer 13 or 14, either directly or through an attenuator to the mixer. The attenuators can be controlled automatically from an automatic gain control circuit in a manner which will be discussed infra. The attenuators in the probe antenna and directional antenna channels need not be precisely matched but only approximately so. The precise matching will be achieved in effect through the action of a balancing circuit which also will be discussed later.

At the respective mixers 13 and 14 in the probe and directional channels the incoming pulsed r–f signals are converted to pulsed intermediate frequency (i–f) signals through the use of a local oscillator signal from the local oscillator 15 and the well known superheterodyne principle. Alternately, the mixers 13 and 14 might be replaced by r–f detectors followed by video amplifiers (not shown), but the mixer and i–f system is preferred for the ease of gain control and the relatively wide dynamic range of linear operation which it offers.

Following the mixers 13 and 14, the two channels differ for several stages. The i–f signals from the mixer 14 in the probe antenna channel is fed through a blanking circuit 16 and then to a main i–f amplifier 17. The blanking circuit 16 is a conventional one such as is used to blank out the transmitted pulse in standard radar sets. The corresponding signal in the directional antenna channel is fed through an i–f amplifier for balancing 18, the purpose of which will be explained later, and then through an i–f delay line 19 to a point where it joins the probe channel signal and proceeds with that signal through the main i–f amplifier 17. The i–f amplifier for balancing 18 is arranged so that it may be gain controlled to increase or decrease the output signals as desired. The i–f delay line 19 can be of a transmission line, lumped constant, or supersonic type, such as are obtainable commercially; it delays the pulsed signal passing through it by a pulse width or more, and, incidentally to the purposes of this invention, also attenuates the signal.

After being combined, the probe and directional channel signals proceed through the main i–f amplifier 17, a detector 21, and a video amplifier 22, all three of which conform generally to standard design for pulsed radars. The only exception is that the main i–f amplifier 17 is capable of being automatically gain controlled over a wide dynamic range of operation in a manner similar to that used in past and present guided missile design.

From the video amplifier 22, the combined signals are carried to a discriminating gate circuit 23, a probe signal selector 24, and a directional signal selector 25. The discriminating gate circuit 23 is a circuit such as a one-shot multivibrator which generates a voltage gate beginning at the instant the first of several pulses arrives at its input. The length of the gate is pre-adjusted to a desired value which is generally of the order of magnitude of a hundred pulse widths. The output of the discriminating gate circuit 23 is connected to the blanking circuit 16 mentioned earlier and also to a pulse generator circuit 26. Timed by the start of the discriminating gate, the pulse generator 26 generates a pulse of duration less than or equal to the pulse width of the incoming radar signal at the two antennas. This pulse is applied directly to the probe signal selector 24 and through a pulse delay circuit 27 to the directional signal selector 25. The pulse delay circuit 27 can be a simple lumped constant video delay line. The two signal selector circuits 24 and 25 are coincidence-type gated circuits which pass a signal or part of signal coming from the video amplifier only when that signal or part of signal coincides in time precisely with the pulse supplied to that selector circuit.

The signal coming from the directional signal selector 25 is coupled into the dividend arm of a division circuit 28. The corresponding signal from the probe signal selector 24 is coupled into the divisor arm of the division circuit 28 and also into an automatic gain control circuit 29. The automatic gain control circuit 29 can be of a design which is conventional for this function, but it should be speeded up to give the fastest operation possible without danger of throwing into oscillation the whole feedback of which it is a part. The division circuit 28 does what its name implies: it effectively divides the amplitude of the signal on its dividend arm by the amplitude of the signal on the divisor are to derive an output which is proportional to the quotient of the two. It may accomplish this by converting the signals to logartithmic form, substracting the divisor logarithm from the dividened logarithm, and then reconverting the result to antilog form; or, alternately, it may use certain other division techniques known to the electronic computation field.

The output of the division circuit 28 is directed to a balancing circuit 31 and to a commutator 32. The balancing circuit 31 is essentially a detector with a long time constant which is connected to control the gain of the *i–f* amplifier for balancing 18. Connected in this manner, it infers a reference or balance point and it acts to increase the gain of the *i–f* amplifier for balancing 18 if the average of the incoming signal over a period of time falls below that reference, and, contrarily, acts to decrease the gain if the average is high compared to the reference. The commutator 32 can be either electronic or mechanical. In either case, it is a device which is capable of sorting information into appropriate directional channels in accordance with a directional reference indication established by the position of the directional antenna. The commutator 32 passes the sorted directional information, such as up, down, right, and left information, on to directional output circuits 33 which process this information into the desired form.

To aid in understanding the operation of the invention an illustrative waveform diagram is shown in FIG. 2. Discussion of the operation may begin with the pulsed radar signal received at the probe antenna 12. This signal has a waveform as illustrated in FIG. 2A and is converted to a pulsed *i–f* signal having the same waveform at the mixer 14. At the blanking circuit 16, the trailing portion of this *i–f* signal is blanked out, and only the leading portion is passed as illustrated in FIG. 2B. This reduces the signal to a known pulse width and eliminates any effects from associated echo, coding, or jamming pulse signals which follow the desired signal. The leading portion of the signal initiates the blanking action by passing through the main *i–f* amplifier 17, detector 21, video amplifier 22, and discriminating gate circuit 23, the last of which applies the blanking control. The inherent delay through this series of circuits through which the signal must pass will generally retard the feedback blanking action long enough so that the leading portion is passed and only the trailing portion blanked, but if not, a simple delay line (not shown) may be added in series to allow more of the leading portion of the signal to be passed. The discriminating gate circuit 23 acts in prolonged manner so that the blanking is not discontinued as soon as the effect of the leading portion of the signal has passed. In the waveform diagram of FIG. 2 the envelopes of typical signal waveforms before and after blanking are shown as FIG. 2(A) and FIG. 2(B) respectively.

The signal arriving at the directional antenna 11 is the same as the signal arriving at the probe antenna 12, but the directinal antenna 11 modulates the incoming signal by the scanning or switching action employed. Thus, mathematically, an incoming signal containing noise modulation f(t) will be modulated by the scanning or switching function g(t) so that a product modulation f(t)g(t) results. In contrast the signal in the probe antenna 12 is given no directional modulation and remains simply f(t). The directional antenna signal 11 is passed to a mixer 13 where it is converted to an *i–f* signal. This signal is of the same intermediate frequency as that established in the probe channel since the same local oscillator frequency is superheterodyned against the same incoming radar frequency in each case. The *i–f* signal from the mixer 13 in the directional antenna channel is amplified by the *i–f* amplifier for balancing 18, and then is delayed by the *i–f* delay line 19, which inherently attenuates the signal somewhat as well as delaying it in time. The gain control action applied to the *i–f* amplifier for balancing 18 will be explained later. At the output of the delay line 19 the signal from the directional channel and that from the probe channel are connected together, or, more aptly, are superimposed. Because of the delay, the directional signal follows the probe signal. Typical waveforms for the envelopes of the directional antenna signal as fed to the mixer, the directional antenna signal after delay, and the probe and directional signals when superimposed are shown as waveforms in FIG. 2(C), FIG. 2(D), and FIG. 2(E) respectively. The fact that the waveform involving f(t)g(t) have a more complex modulation than those involving simply f(t) is indicated by showing five alternate amplitudes rather than three.

The superimposed probe and directional signals are processed through the main *i–f* amplifier 17, detector 21, and video amplifier 22. These are conventional in their operation. The output of the video amplifier 22 is then a video signal directly corresponding in waveform to the envelope of the *i–f* input of the main *i–f* amplifier 17 but being displaced slightly in time due to an inherent delay in the three aforementioned circuit blocks. The output is thus as shown in FIG. 2(F) of the waveform diagram.

The leading edge of the video amplifier output signal of FIG. 2F triggers action of the discriminating gate circuit 23. This circuit then proceeds in its own action without being further affected by signals arriving at its input. It generates a gate which is used for triggering the pulse generator 26, and which is also used for blanking as described previously. A typical waveform for the discriminating gate is shown in the waveform of FIG. 2(G). The length of the gate from the discriminating gate circuit 23 may be adjusted to discriminate against a number of signals or portions of signals following the leading portion of the desired signal. The discrimination is effected by failure of the discriminating gate circuit 23 to recycle itself and thereby reactivate the circuits connected to its output until after a prescribed interval of time has passed. In particular, the discriminating gate circuit 23 may be used in conjunction with the ensuing pulse generator 26, pulse delay 27, probe signal selector 24, and directional signal selector 25 as an aid to selecting one desired radar signal out of many on the basis of pulse repetition frequency differences.

The pulse generator circuit 26, which as a result of the action heretofore described is triggered in synchronism with the signal arriving through the probe antenna channel, generates a pulse that opens up the probe signal selector 24 and allows the probe signal or the leading portion of that signal to pass through, but excludes others. After passing through the pulse delay element 27, which introduces a time delay approximately equal to that of the *i–f* delay line 19, the same pulse arrives at the directional signal selector 25 in synchronism with the leading portion of the signal received through the directional channel, and it performs a similar function of passing that signal or portion of signal through to later circuits while excluding others. In the accompanying waveforms, the pulse before and after delay appears in FIG. 2(H) and FIG. 2(I) respectively, and the portions of the signal of FIG. 2(F) admitted through the probe and directional signal selectors 24 and 25 as a result of coincidence with the signals of FIG. 2(H) and FIG. 2(I) are shown in FIG. 2(J) and FIG. 2(K) respectively.

The signal emerging from the probe signal selector 24 serves as input to the automatic gain control circuit 29 which controls the gain of the main $i$–$f$ amplifier 17 in conventional fashion. When attenuators are used in front of the mixers in the probe and directional channels 12 and 11 respectively, the automatic gain control circuit 29 may also control a solenoid or motor arrangement which automatically positions these attenuators. Mathematically, the automatic gain control action is such that for a noise signal f(t) entering the front end of the main $i$–$f$ amplifier 17 a feedback arises which tends to hold the output constant at some value K. This is equivalent to saying that the gain G of the main $i$-$f$ amplifier 17 is automatically adjusted toward a value $$G = \frac{K}{f(t)}$$

so that the product $$Gf(t) = \frac{K}{f(t)} f(t) = K.$$

However, since there are inherent delays in the feedback action (especially in the automatic gain control circuit 29 itself), the adjustment of gain to the value $$G = \frac{K}{f(t)}$$

is achieved in time to be effective only against the low and intermediate frequency noise modulations involved in f(t), and not against the very high noise frequencies. A mathematical analysis of the possible additional automatic control of the attenuators ahead of the mixers would be similar to this automatic gain control analysis, except that this feedback action is slower and is effective only against the low noise frequencies. The reason for possibly using automatic attenuator control is that it affords a feedback which is effective against the low frequencies and which thereby releases the full dynamic range of automatic gain control for use against intermediate frequencies.

The outputs of the probe signal selector 24 and the directional signal selector 25 are fed to the division circuit 28 as divisor and dividend respectively. The division circuit 28 is one which performs a division function either instantaneously or at least before a second incoming pulse radar signal is received at the antennas and admitted by the discriminating gate circuit 23. For pulsed radar information such as is being processed here, effecting the division before the next pulse is received is for all practical purposes equal to instantaneous division, and it does not matter which system is used. However, since instantaneous or practically instantaneous division requires circuits with very wide bandwidth, division in the interval before arrival of the next pulse is often desirable. Because the several possible division techniques differ widely in the specific circuits used, waveforms through the division process have not been shown in the diagrams of FIG. 2, but an output waveforms might have the general appearance of the waveform of FIG. 2(L).

Mathematically, the division circuit 28 divides the directional channel signal f(t)g(t) by the probe channel signal f(t) to obtain an output proportional to the quotient $$\frac{f(t)g(t)}{f(t)} = g(t),$$

which is the pure directional signal. Considering treatment of the directional signal only, this division process is a repetition of the basic treatment applied by the automatic gain control action, where the gain $$G = \frac{K}{f(t)}$$

was applied to the signal f(t)g(t), giving $$G f(t) = \frac{K f(t)g(t)}{f(t)} = K g(t).$$

The difference between the dividing action and the automatic gain control action is that the former acts on each radar pulse received and thus takes out all the pulse-to-pulse modulation frequencies involved in f(t), whereas, as stated, the gain control action is not effective in dividing out the high frequency components of f(t). On the other hand, the gain control action is effective against a much wider range of modulation amplitude. Thus, with an automatic attenuator circuit (not shown) acting at low frequencies only, with the gain control circuit 29 acting at intermediate and low frequencies, with the automatic division circuit 28 acting at all frequencies, and with these elements acting on incoming signals in this order, the system acts on low, intermediate, and high frequency components of f(t) so that all frequency components of noise are removed without limiting the dynamic range of action to the capabilities of the division circuit 28 alone. In this way over-all effective noise cancellation can be obtained with signal power modulations in excess of 100 db.

The quotient signal from the division circuit 28 serves as input to the commutator 32 and to the balancing circuit 31. The action at the commutator 32 is conventional; signals are sorted into directional channels by electronic or mechanical means in synchronism with the scanning or switching action of the directional antenna 11. Directional output circuits 33 convert the sorted information into desired form. The information thus derived is basically more similar to that derived ny simultaneous lobing than to information derived by pure scanning or lobe-switching techniques. That is, complete information indicating whether a target is located to the right or left of the antenna axis, for instance, is derived from a single incoming pulse, rather than by comparison of a pulse or pulses obtained while scanning right with a corresponding pulse or pulses obtained from the left as in the usual scanning or lobing systems. This is true since a signal from the right which is of less amplitude than the probe signal indicates a source direction from the left, and so on. The probe system differs from a true simultaneous lobing system in that information giving both vertical and horizontal coordinates is not obtained from the same incoming pulse, but this is often not of consequence so long as opposite directions are examined simultaneously. Because of these relationships the system here claimed might be termed a quasi-simultaneous system.

The signal from the division circuit 28 to the balancing circuit 31 provides a basis for cancelling the effect of dissimilarities between the probe and directional channels. If, due to inherent differences in characteristics or drifts in characteristics beyond easy control, the directional channel produces an average signal of higher or lower amplitude than the probe signal when averaged over at least one complete scanning or switching cycle, the balancing circuit 31 senses this in the output of the division circuit 28 and acts to restore balance by decreasing or increasing, respectively, the gain of the *i-f* amplifier for balancing 18. This slow-acting feedback arrangement alleviates difficulties which would be encountered in attempting to match the two channels precisely.

In all of the foregoing discussion consideration has been given only to a situation in which the directional channel signal is delayed with respect to the probe signal. Actually, the system would also be workable with the situation reversed, that is, with the probe signal delayed instead. However, the situation as presented heretofore is preferable when ease of adaptation of certain possible devision circuits is considered.

Obviously many modifications and variations of the present invention are possible in the light of the above teachings. It is therefor to be understood that within the scope of the appended claims the invention may be practiced otherwise than as specifically described.

What is claimed is:

1. A system for obtaining accurate directional information with regard to the relative position of a pulsed radar source comprising means for receiving signals from said source through a directional antenna and a probe antenna, and means for dividing the signal from said directional antenna by the signal from said probe antenna over a wide dynamic range of modulation.

2. A system for obtaining accurate directional information with regard to the relative position of a pulsed radar source comprising means for receiving signals from said source through a directional antenna and a probe antenna, and means for dividing the signal from said directional antenna by the signal from said probe antenna over a wide dynamic range of modulation, said dividing means including an automatic gain control circuit and a division circuit.

3. A system for obtaining accurate directional information with regard to the relative position of a pulsed radar source comprising means for receiving signals from said source through a directional antenna and a probe antenna, means for eliminating other undesired signals from the desired probe and directional antenna signals including means for discriminating and selecting said desired signals on a time basis, and means for dividing the signal from said directional antenna by the signal from said probe antenna over a wide dynamic range of modulation.

4. A system for obtaining accurate directional information with regard to the relative position of a pulsed radar source comprising means for receiving signals from said source through a directional antenna and a probe antenna, means for combining the signal from said probe antenna with a delayed signal from said directional antenna, means for separating and selecting only the desired portion of said probe and directional antenna signals including means for gating the desired portions of said signal and discriminating against the undesired portions of said signals on a time basis, and means for dividing the signal from said directional antenna by the signal from said probe antenna over a wide dynamic range of modulation.

5. A system for obtaining accurate directional information with regard to the relative position of a pulsed radar source comprising a directional antenna, a probe antenna, means for delaying the signal from one of said antennas, means for combining said delayed signal with the signal from the other of said antennas, means for separating said directional and probe signals, automatic gain control means adapted to receive the probe signal and apply a gain control to said combined signals, and a division circuit adapted to receive and divide the directional signal by the probe signal, and provide an output proportional to the noise-free directional information.

6. A system for obtaining accurate directional information with regard to the relative position of a pulsed radar source comprising a directional antenna, a probe antenna, means for delaying the signal from one of said antennas, means for combining said delayed signal with the signal from the other of said antennas, means for separating and gating only the desired portions of said directional and probe signals, automatic gain control means adapted to receive the probe signal and apply a gain control to said combined signals, and a division circuit adapted to receive and divide the directional signal by the probe signal and provide an output proportional to the noise-free directional information.

7. A system for obtaining accurate directional information with regard to the relative position of a pulsed radar source comprising a directional antenna, a probe antenna, means for delaying the signal from said directional antenna, means for combining said delayed signal with the signal from said probe antenna, a discriminating gate circuit, signal selector means associated with said gate circuit for separating and selecting only the desired portions of said directional and probe signals, automatic gain control means adapted to receive the probe signal and apply a gain control to said combined signals, a division circuit adapted to receive and divide the directional signal by the probe signal, and provide an output proportional to the noise-free directional information, and a blanking circuit associated with said discriminating gate circuit and adapted to eliminate the undesired trailing portion of said probe antenna signal prior to combining said signals.

8. A system for obtaining accurate directional information with regard to the relative position of a pulsed radar source comprising a directional antenna, a probe antenna, means for delaying the signal from said directional antenna, means for combining said delayed signal with the signal from said probe antenna, means for amplifying and detecting said combined signal, means for separating said directional probe signals, automatic gain control means adapted to receive the probe signal and apply a gain control to said amplifying means, a division circuit adapted to receive and divide the directional signal by the probe signal and provide an output proportional to the noise-free directional information, commutator circuit adapted to receive the output from said dividing circuit, and directional output circuits adapted to receive and utilize the output from said commutator circuit.

9. A system for obtaining accurate directional information with regard to the relative position of a pulsed radar source comprising a directional antenna, a probe antenna, a delay line associated with said directional antenna, a main amplifier adapted to combine the directional signal from said delay line and the probe signal from said probe antenna, a probe signal selector adapted to receive said combined signals and pass the desired portion of the probe signal only, a directional signal selector adapted to receive said combined signal and pass only the desired portion of the directional signal, an automatic gain control circuit adapted to receive the probe signal and apply a gain control to said main amplifier, and a division circuit adapted to receive a probe signal from said probe signal selector and a directional signal from said directional signal selector and provide an output which is the quotient of the directional signal divided by the probe signal.

10. A system for obtaining accurate directional information with regard to the relative position of a pulsed radar source comprising a directional antenna, a probe antenna, a delay line associated with said directional antenna, a main amplifier adapted to combine the directional signal from said delay line and the probe signal from said probe antenna, a discriminating gate circuit associated with said main amplifier adapted to receive the combined signals therefrom, a pulse generator adapted to receive the gate from said discriminating gate circuit and provide a pulse output, a probe signal selector adapted to receive said combined signals and the pulse output from said pulse generator and pass the probe signal only, a pulse delay circuit associated with said pulse generator, a directional signal selector adapted to receive said combined signal and said delayed pulse and pass only the directional signal, an automatic gain control circuit adapted to receive the probe signal and apply a gain control to said main amplifier, and a division circuit adapted to receive a probe signal from said probe signal selector and a directional signal from said directional signal selector and provide an output which is the quotient of the directional signal divided by the probe signal.

11. A system for obtaining accurate directional information with regard to the relative position of a pulsed radar source comprising a directional antenna, a probe antenna, a blanking circuit associated with said probe antenna, a delay line associated with said directional antenna, a main amplifier adapted to combine the directional signal from said delay line and the probe signal from said blanking circuit, a discriminating gate circuit associated with said main amplifier adapted to receive the combined signals therefrom and apply a voltage gate to said blanking circuit, a pulse generator adapted to receive the gate from said discriminating gate circuit and provide a pulse output, a probe signal selector adapted to receive said combined signals and the pulse output from said pulse generator and pass the probe signal only, a pulse delay circuit associated with said pulse generator, a directional signal selector adapted to receive said combined signal and said delayed pulse and pass only the directional signal, an automatic gain control circuit adapted to receive the probe signal and apply a gain control to said main $i\text{–}f$ amplifier inversely proportional to the probe signal, and a division circuit adapted to receive a probe signal from said probe signal selector and a directional signal from said directional signal selector and provide an output which is the quotient of the directional signal divided by the probe signal.

12. A system for obtaining accurate directional information with regard to the relative position of a pulsed radar source comprising a directional antenna, a probe antenna, a mixer associated with each of said antennas, a local oscillator adapted to apply a local oscillator signal to both of said mixers, a blanking circuit associated with the mixer in said probe antenna circuit, an $i\text{–}f$ amplifier for balancing associated with the mixer in said directional antenna channel, an $i\text{–}f$ delay line associated with said balancing amplifier, a main $i\text{–}f$ amplifier adapted to combine the directional signal from said $i\text{–}f$ delay line and the probe signal from said blanking circuit, a detector associated with said main $i\text{–}f$ amplifier, a video amplifier associated with said detector, a discriminating gate circuit associated with said video amplifier and adapted to receive the combined signals therefrom and apply a voltage gate to said blanking circuit, a pulse generator adapted to receive the gate from said discriminating gate circuit and provide a pulse output, a probe signal selector adapted to receive the combined signals from said video amplifier and the pulse output from said pulse generator and pass the desired portion of the probe signal only, a delay circuit associated with said pulse generator, a directional signal selector adapted to receive said combined signal and said delayed pulse and pass only the desired portion of the directional signal, an automatic gain control circuit adapted to receive the probe signal and apply a gain control to said main $i\text{–}f$ amplifier inversely proportional to the probe signal, a division circuit adapted to receive the probe signal from said probe signal selector and the directional signal from said directional signal selector and provide an output which is the quotient of the directional signal divided by the probe signal, a balancing circuit adapted to receive the noise-free directional signal from said dividing circuit and apply a slow-acting feedback to said $i\text{–}f$ amplifier for balancing, a commutator circuit adapted to receive the noise-free directional information from said division circuit and directional reference information from said directional antenna, and directional output circuits adapted to utilize the output from said commutator.

* * * * *